Figure 4C:
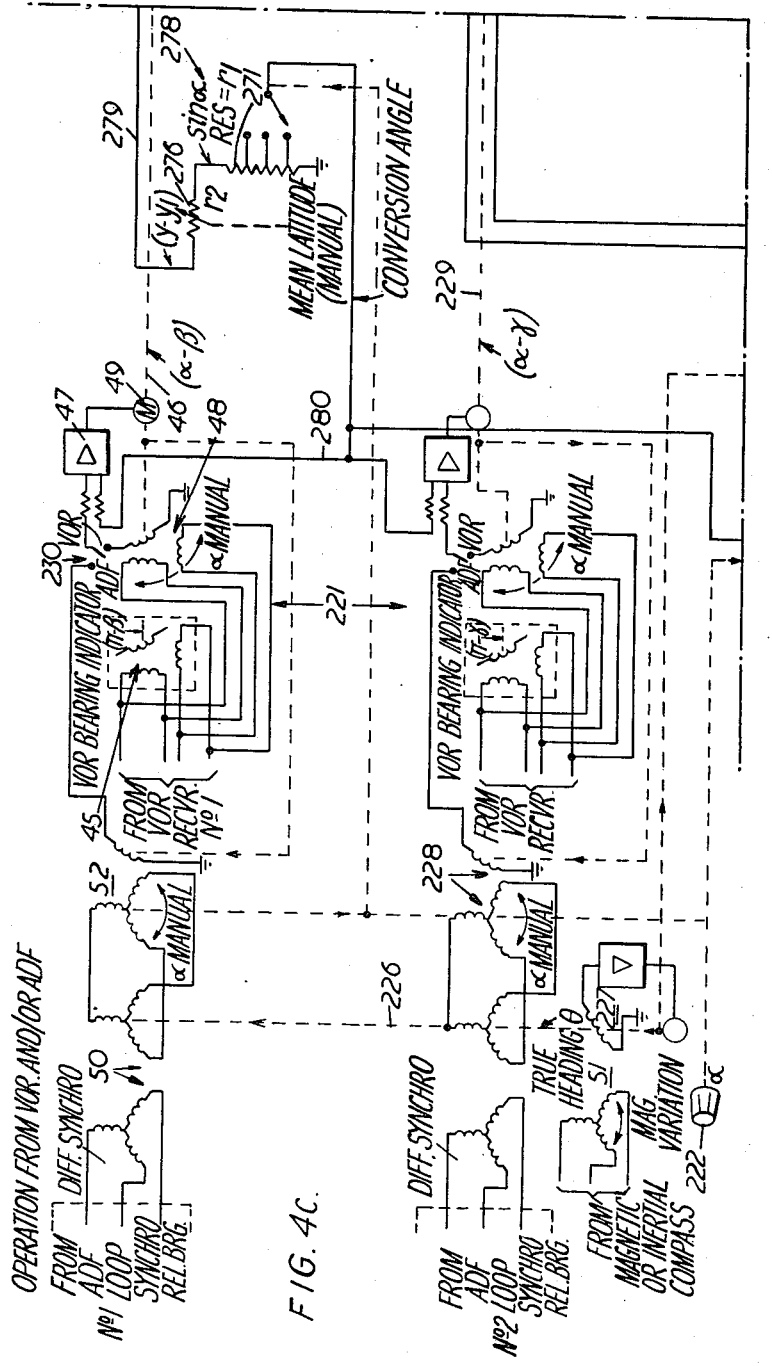

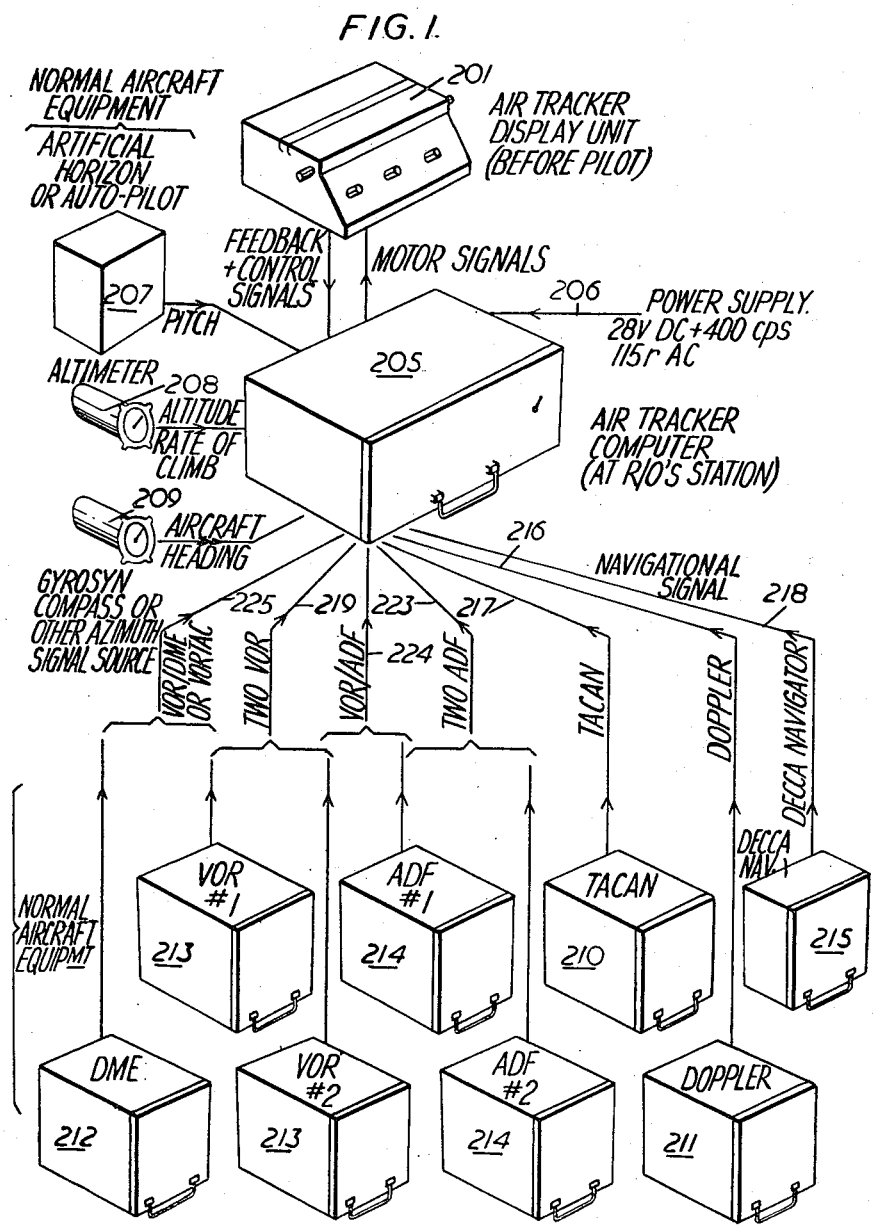

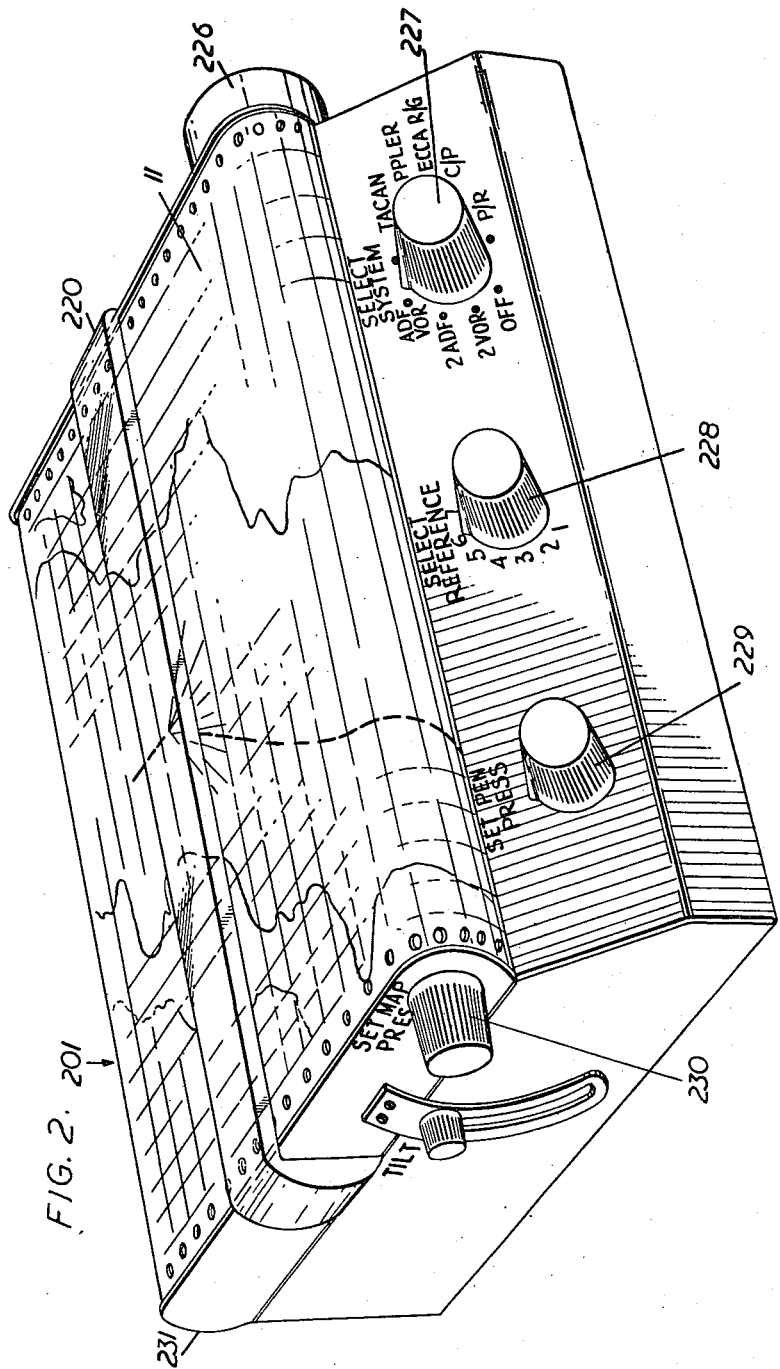

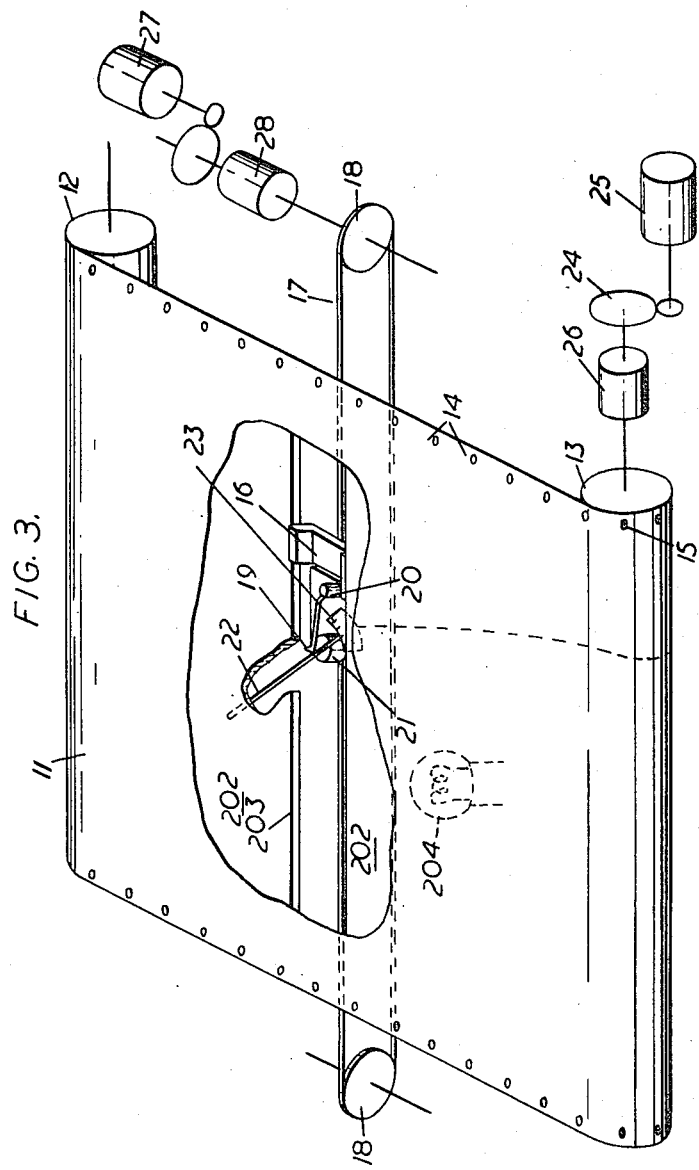

FIG. 4A.

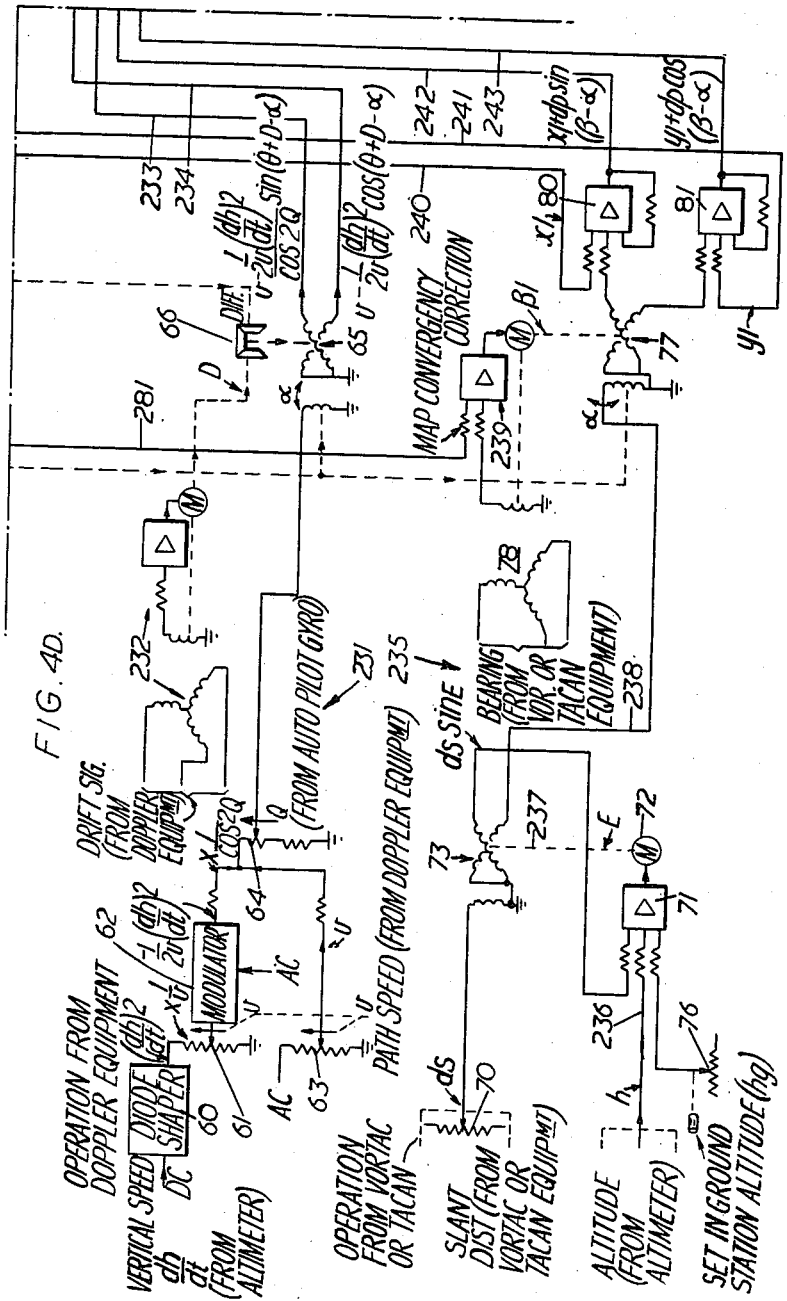

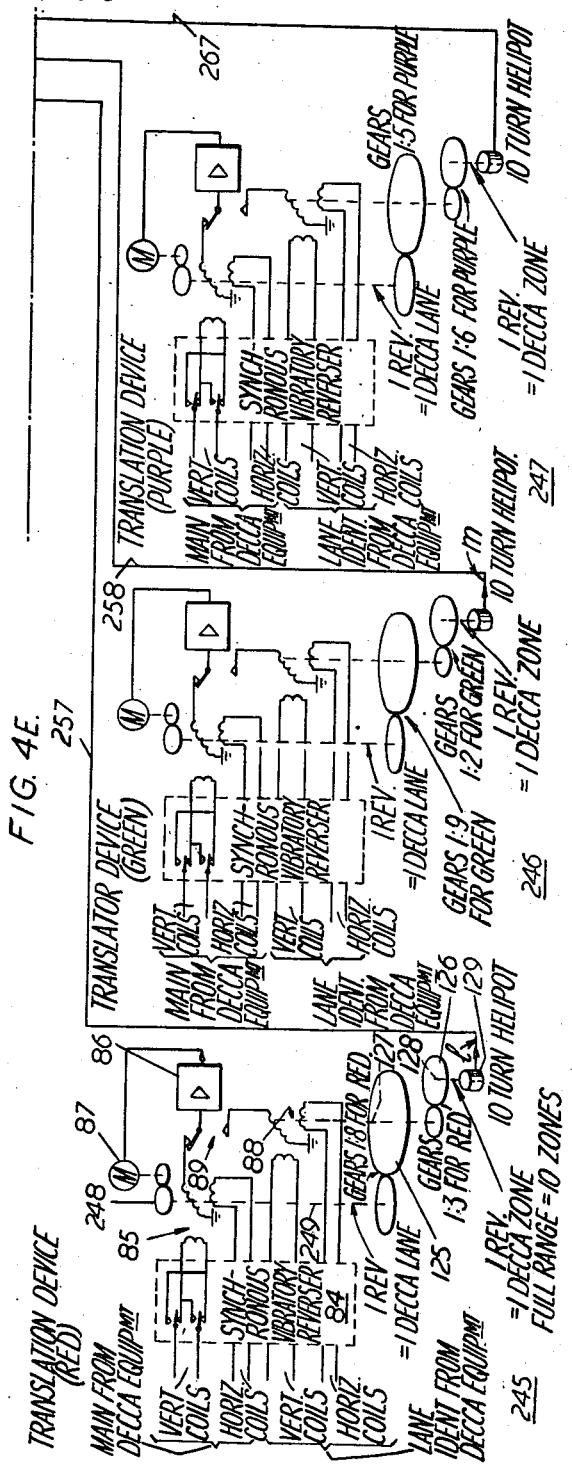

Dec. 17, 1963   M. D. TOOLEY   3,114,912
NAVIGATION AIDS
Filed Nov. 28, 1958   11 Sheets-Sheet 8
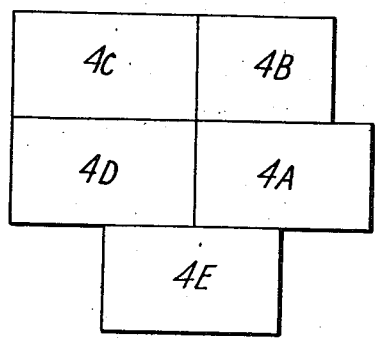
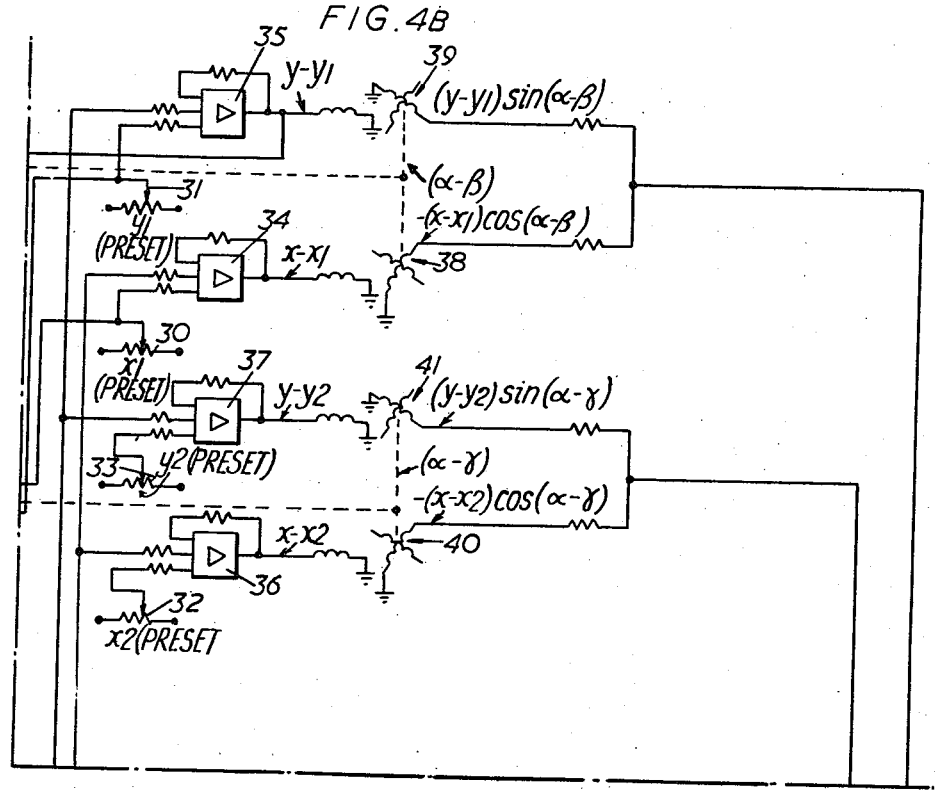

Dec. 17, 1963  M. D. TOOLEY  3,114,912
NAVIGATION AIDS

Filed Nov. 28, 1958  11 Sheets-Sheet 10

A is AIRCRAFT
M is MASTER STATION
R is RED SLAVE STATION    G is GREEN SLAVE STATION

United States Patent Office 3,114,912
Patented Dec. 17, 1963

3,114,912
NAVIGATION AIDS
Michael Dent Tooley, Aylesbury, England, assignor to General Precision Systems Limited
Filed Nov. 28, 1958, Ser. No. 776,961
Claims priority, application Great Britain Nov. 29, 1957
4 Claims. (Cl. 343—105)

This invention is concerned with navigation aids, especially, but not exclusively, those for use in air navigation.

The navigation aids at present in use by aircraft consist, in general, of receiving and computing equipment aboard the aircraft which detects and interprets wireless signals broadcast by one or more of a number of appropriately-sited ground transmitters or radio beacons. In some aids, the aircraft equipment itself transmits signals to be received and relayed back to the aircraft. Thus, in one case the Doppler effect is used to enable the aircraft equipment to obtain information concerning the path speed and drift angle of the aircraft.

In a number of other forms of navigation aid, each ground transmitter sends out a signal which is of such a character that the associated equipment aboard an aircraft and tuned to that transmitter can compute a bearing with respect to the known fixed position of the transmitter (e.i. VOR and ADF equipments). This bearing information is then presented visually to the pilot or navigator, generally by an instrument having a pointer to traverse an azimuth scale. Range information, that is to say, the actual distance of the aircraft from the ground transmitter or beacon as distinct from the bearing, can be obtained from a single ground beacon on the "echo" principle, by providing the aircraft with equipment to transmit a signal that is picked up and re-transmitted to the aircraft by the beacon (e.g. VOR/DME or VORTAC, and TACAN equipments). More usually, however, the aircraft is provided with equipment to enable bearings with respect to two different ground beacons to be determined simultaneously (e.g. twin VOR and ADF equipments or VOR/ADF), so that by plotting on a map a position fix is obtained at the point of intersection.

In another form of aid, notably the Decca Navigator, a special pattern of signals transmitted from three ground stations gives the aircraft equipment the necessary information to derive two indicated signal values which represent the co-ordinates of the aircraft's position according to a co-ordinate system employing that particular pattern as its basic. Thus, if the pilot or navigator has a map gridded with lines according to the co-ordinate system employed, the two indicated signal values enable the aircraft's position to be plotted thereon. It is, however, to be preferred that the information of the aircraft's position should be immediately available without the aircrew having first to make plots on a map, and to this end many aircraft using this aid are fitted with an instantaneous display device. The display device consists of a slowly-driven chart or map strip upon which a recording pen continuously traces the aircraft's track, the chart drive varying in response to one of the aforementioned co-ordinate signal values while lateral displacements of the pen across the chart are determined by the other co-ordinate signal.

The special pattern of signals, which the three ground stations of this particular last-mentioned navigation aid system transmit, consists of two intersecting families of hyperbolae. The map co-ordinates derived by the system are therefore hyperbolic. Since the movements of the chart recorded, that is to say the travel of the map strip and the movement of the pen across it, are, for convenience in construction, rectilinear and at right angles to one another, the hyperbolic nature of the co-ordinate system employed has to be reflected instead in the map features, if accuracy is to be preserved. The map strips for this use are consequently prepared according to a special unusual hyperbolic system of projection, and can appear distorted to eyes used to maps prepared according to more conventional projection methods. Also, straight tracks have the appearance of being somewhat curved when plotted on these map strips, which is a disadvantage.

It is an object of the invention to provide equipment for presenting navigation aid information which is an improvement on the display equipments at present in use.

It is a further object to afford, in a navigation aid for aircraft and the like, a computer which, from the information received (which may be the same as that available in existing systems), derives the aircraft's instantaneous position as two co-ordinate-signal values based on co-ordinate-axes which are rectilinear and at right angles, so that the track of the aircraft can be represented on a display unit or chart recorder without the necessity for using special and unusualy-distorted chart maps. That is to say, the track can be drawn on a conventional type of map, on Mercator's projection for example, with straight tracks appearing as substantially straight lines on the map.

The invention also includes within its scope the display unit or chart recorder per se which is arranged to receive the co-ordinate signals from such a computer and position its pen and chart or map accordingly.

According to another object of the invention, the chart recorder which draws the aircraft's track is arranged to mark the track at equal intervals of time, so that the track affords an indication of the speed of the aircraft relative to the ground, as well as of direction. In the preferred form, the time markers along the track are constituted by short gaps where the pen ceases to ink the chart for a brief period.

According to a further object, means is provided for a direct display on the chart of aircraft drift angle. Such means may comprise a swinging pointer operatively-connected to be set automatically to indicate the aircraft heading, and mounted to move with the pen so that it is always in position to be read against the chart and the recorded track at the point thereon representing the instantaneous position of the aircraft at the time of reading.

Figure 6:
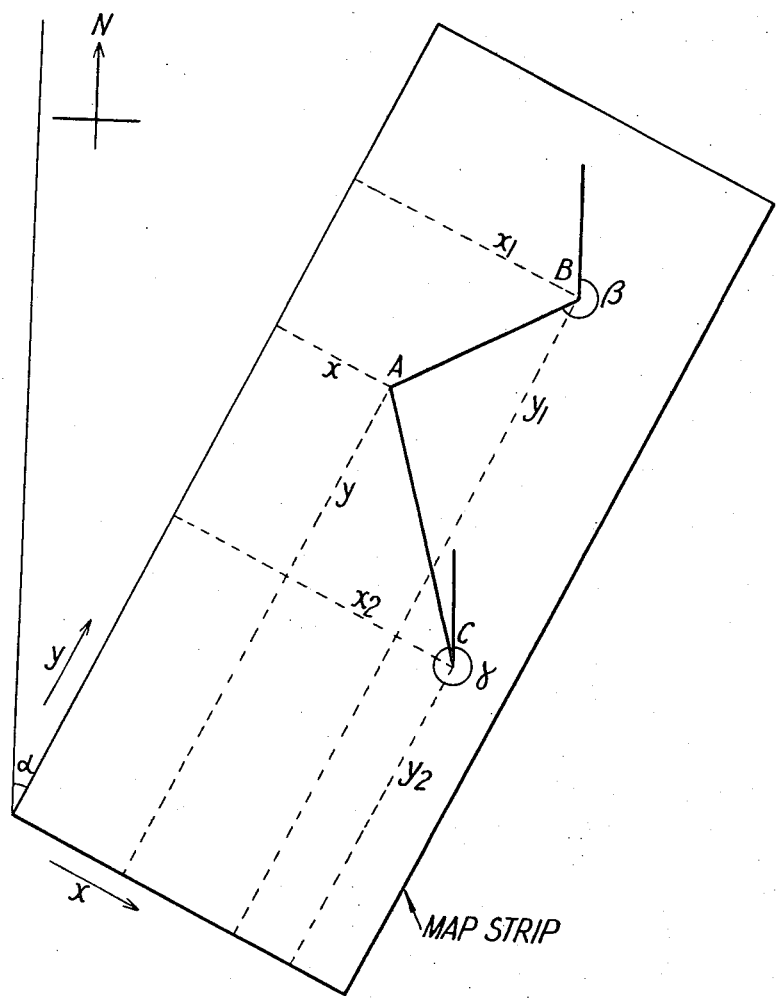
Figure 7:
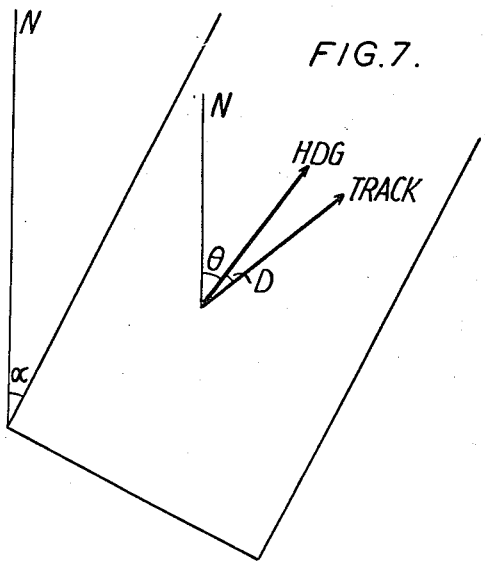
Figure 8:
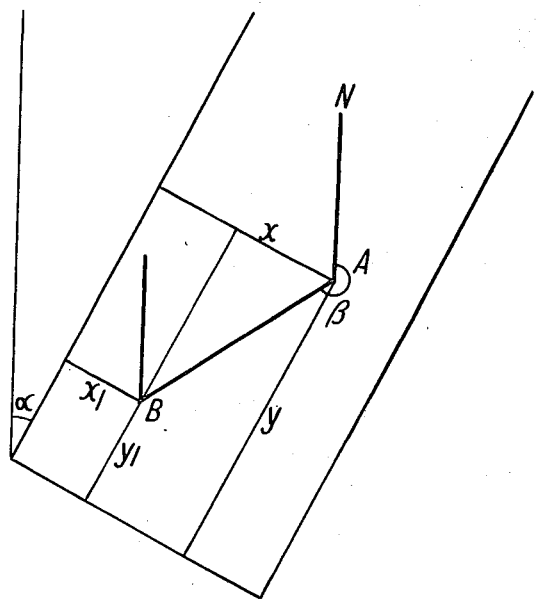
Figure 9:
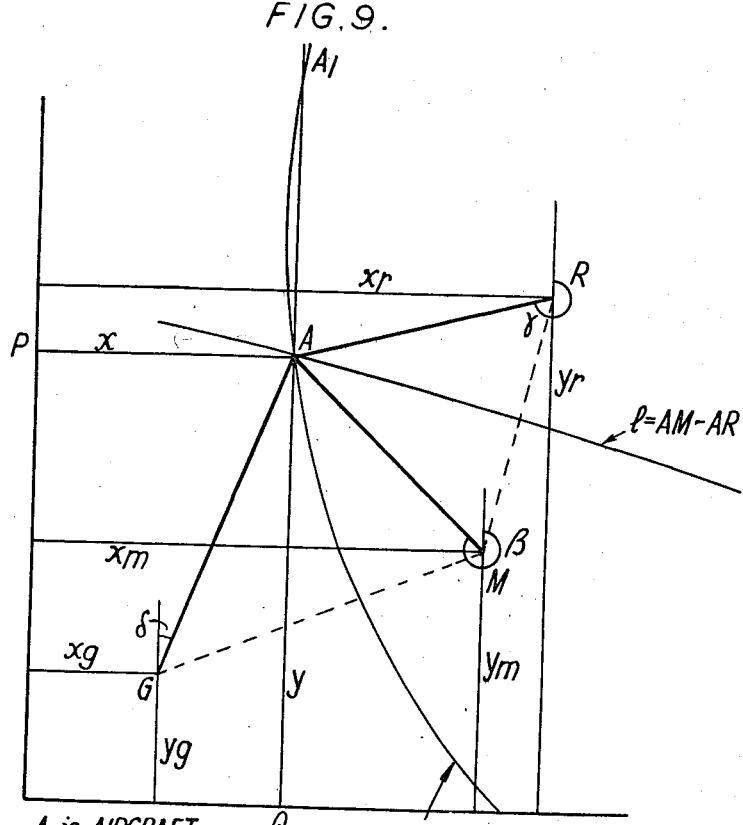
Figure 10:
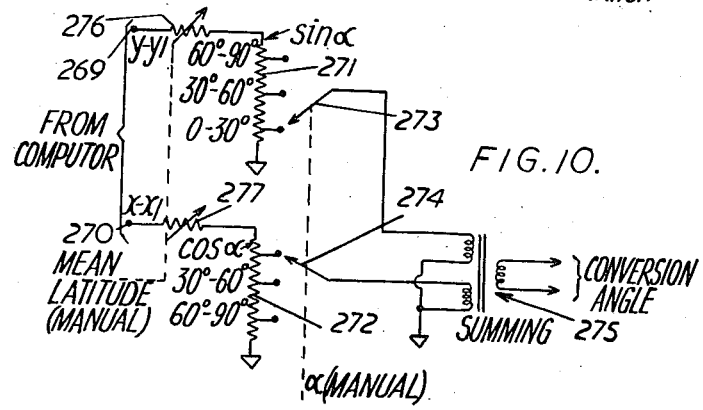

Other objects of the invention will be apparent from the following description, given by way of example, of aircraft equipment in accordance with the invention. Reference will be had to the accompanying drawings in which:

FIGURE 1 is a block diagram of the equipment illustrating the equipment locations and the nature of the inputs, FIGURE 2 is a pictorial view of the display unit or chart recorder, FIGURE 3 is a diagrammatic presentation of the chart recorder lay-out, FIGURE 4 is a composite diagram, in five parts 4A to 4E, illustrating the layout of the computer section of the equipment, FIGURE 5 is a block diagram illustrating the manner in which the several parts of FIGURE 4 fit together, FIGURE 6 is a diagram illustrating the geometry of the chart for bearings received from two radio beams, FIGURE 7 is a diagram illustrating the geometry of the chart for information derived by Doppler equipment, FIGURE 8 illustrates the chart geometry for the case where the information is derived from a single ground beacon in the form of a bearing and a range, FIGURE 9 illustrates the chart geometry when the information available is from ground stations setting up signal patterns in the form of intersecting families of hyperbolae, and FIGURE 10 shows a method of deriving a correction for map projection error alternative to that shown in FIGURE 4.

Referring firstly to FIGURE 1, this shows the equipment in two portions, namely the display head or chart recorder 201 which is mounted before the aircraft pilot to enable him to observe and continually check his course, and the computer portion 205 which derives the driving inputs for the display head and may be located at the radio officer's station in the aircraft.

In addition to A.C. and D.C. power inputs fed in as indicated at 206, the computer 205 is capable of receiving information concerning the aircraft's pitch attitude, altitude and rate of climb, and heading, from the aircraft's artificial horizon or autopilot 207, altimeter 208, and gyrosyn compass or equivalent azimuth signal source 209, respectively.

The computer also receives inputs from the existing normal navigation equipment of the aircraft. The navigation equipments represented in block form in the diagram are TACAN equipment 210, Doppler equipment 211, DME equipment 212, two VOR equipments 213, two ADF equipments 214, and Decca Navigator equipment 215. Doppler, TACAN or Decca Navigator each constitutes a complete navigational set in itself, and inputs from any one of these may be fed to the computer as indicated at 216, 217 and 218. In the case of VOR, ADF and DME, each of these has to be paired with another equipment. The input to the computer 205 of signals from twin VOR or twin ADF equipment is indicated at 219, 223 respectively, the input of signals from VOR/ADF equipment is indicated at 224, and the input of signals from VOR/DME or VORTAC equipment is indicated at 225. The computer 205 in any single aircraft may receive one or more of the inputs 216 to 219 and 223 to 225, according to whether the particular aircraft possesses one or more of such navigational equipments.

FIGURE 2 shows the chart recorder or display head 201 as it appears to the pilot. It has various manual selector knobs and controls 226 to 230, and the map display is carried by a tiltable top deck 231.

Referring now to FIGURE 3, this shows in diagrammatic form the lay-out of the display unit or chart recorder 201. The chart or map strip 11 is fed from a top roller 12 and rewound upon a bottom roller 13. The edges of the map strip 11 are perforated, the perforations 14 engaging with teeth 15 around the ends of the lower roller 13 to ensure registration of the map with the roller shaft position, the chart drive being applied to the bottom roller. Between the rollers 12 and 13, the map strip slides over a sheet 202 of transparent material, for example synthetic plastic material, through which the map is illuminated from behind, as by a light source 204.

The transparent plastic sheet has a transverse slot 203 across its centre to enable a small carriage 16 to slide laterally at right angles to the direction of travel of the map. The carriage moves on guides, which may be constituted by the slot edges of the transparent sheet, and it is traversed by an endless steel wire or ribbon 17, led around pulleys 18 beyond either edge of the map. The carriage provides a mounting for a pen 19 arranged to draw a track on the back of the map 11, the map being in the form of a transparency. While the pen 19 is operating it is held in contact with the map by a solenoid 20, and a narrow strip of transparent material 220 (FIGURE 2), which again may be synthetic plastic, extends across the front of the map in contact with it and in line with the tip of the pen, to back up the map when the pen is writing on it.

The carriage also supports an electric servo-motor or synchro 21 whose shaft axis passes through the point of contact of the writing tip of the pen with the map and is at right angles to the plane of the map. A pointer 22 and scale 23 are carried by this shaft, for displaying heading and drift as will be described later.

The bottom roller 13 of the map strip 11 is driven through gearing 24 by an electric servo-motor 25, a feedback potentiometer 26 being provided so that the motor signal can be balanced to achieve a null point. The upper roller 12 is driven from the lower by way of a spring-loaded coupling (not shown), which maintains a slight tension in the map to keep it flat. The pen carriage 16 is also driven by an electric servo-motor 27, which is geared to one of the pulleys 18 bearing the steel wire or ribbon 17, and again there is a feed-back potentiometer 28.

In addition to the above which comprise the basic elements of the chart recorder, there are also provided other features of construction (not shown) for rapid change from one map strip to another, with precautions to ensure accurate registration when doing so; for rapidly replenishing or replacing the pen; and for readily setting up initial conditions on the recorder at the commencement of a flight.

For convenience, each map strip is cut so that the normal route of the aircraft lies roughly along its centre. Therefore, in general, the sides of the map strip will not lie north and south. The map is mounted in the recorder so that motion of the aircraft along its route corresponds substantially to movement of the map from the top roller to the bottom one, and deviation from its route to one side or the other corresponds to lateral movement of the pen carriage in one direction or the other away from the centre line of the map. Thus, if signals to drive the two servo-motors 25, 27 are derived by the computer 205 to represent components of aircraft movement along the route and laterally of the route, for operating the chart roller drive and the pen carriage motor respectively, the track of the aircraft will be drawn on the map by the pen, providing the correct initial conditions having been set up. In practice, since the path flown is not a clearly defined straight line, the computer continuously provides signals both for travel along the length of the map and across it.

The geometry of the necessary computation will now be considered for the case where the aircraft is receiving a bearing signal from each of two radio beams. Referring to FIGURE 6, where there is shown a map strip whereof the longitudinal edges are at an angle $\alpha$ with respect to north, the co-ordinates of the aircraft A are given by:

$$y - y_1 = -(x - x_1) \cot(\alpha - \beta)$$
$$y - y_2 = -(x - x_2) \cot(\alpha - \gamma)$$

where $x_1, y_1$ and $x_2, y_2$ are the Cartesian co-ordinates of the two radio beacons in use, across and along the map strip, $\beta$ is the bearing of the aircraft from the beacon B (which is the reciprocal of the bearing of the beacon from the aircraft), and $\gamma$ is the bearing of the aircraft from the beacon C.

Referring now to the composite computer layout of FIGURE 4, this solves the above equations in the form:

$$(y - y_1) \sin(\alpha - \beta) + (x - x_1) \cos(\alpha - \beta) = 0$$
$$(y - y_2) \sin(\alpha - \gamma) + (x - x_2) \cos(\alpha - \gamma) = 0$$

Servo-motors 25, 27 (FIGURE 4A), and potentiometers 26, 28 which are driven thereby, represent the correspondingly referenced motors and potentiometers of the chart recorder of FIGURE 3. The values of $x_1, y_1$ and $x_2, y_2$ are set manually by controls on the computer unit which operate potentiometers 30, 31 and 32, 33 (FIGURE 4B) feeding inputs to summing amplifiers 34, 35, 36, 37. Each prepared map strip for the recorder should have these parameters, and the map angle $\alpha$, printed on it; the $x_1, y_1$ etc. co-ordinates of the radio beacons may be conveniently provided near the geographical position of each beacon on the map. By suitably summing, at the amplifiers 34 to 37, each of the outputs of the potentiometers 30 to 33 with one of the feedback outputs of the potentiometers 26 and 28, as shown, two pairs of potentials $(y-y_1)$, $(x-x_1)$, and $(y-y_2)$, $(x-x_2)$ are obtained for application to sine-cosine resolvers 38, 39, 40, 41. The resolvers, arranged in two pairs 38, 39 and 40, 41, have their shafts positioned so as to represent the angles $\alpha-\beta$ and $\alpha-\gamma$ respectively. The outputs from the first pair of resolvers 39, 38 are $(y-y_1)$ sin $(\alpha-\beta)$ and $(x-x_1)$ cos $(\alpha-\beta)$, and from the second pair of resolvers, 41, 40 $(y-y_2)$ sin $(\alpha-\gamma)$ and $(x-x_2)$ cos $(\alpha-\gamma)$. By feeding the first pair to servo amplifier 42 of motor 25, it will be seen that the first equation is solved, while feeding the second pair to servo amplifier 43 of motor 27 solves the second equation. The two motors 25, 27 will therefore move the chart and the pen carriage respectively until a null point is reached in each case, being the instantaneous position of the aircraft.

Since it is intended that this equipment shall operate in conjunction with existing navigation aid equipments, employing the signals from existing ground stations, the manner of deriving the $\alpha-\beta$ and $\alpha-\gamma$ quantities to position the shafts of the resolvers will depend upon the type of existing equipment installed in the aircraft and the manner in which it interprets and presents the information from the radio beacons it employs.

Section 221 of FIGURE 4 (FIGURE 4C) illustrates the provision for use when the existing aircraft receiving equipment presents the bearing information in respect of each beacon in the form $\pi$ radians minus $\beta$, on an instrument of the type which includes a three-phase output resolver operated by the bearing shaft (VOR equipment). Existing navigation aids sometimes comprise, in addition to this VOR bearing instrument, a further instrument, known as a radio magnetic indicator, which repeats the beacon bearing display but shows it against a moving azimuth scale which is positioned by the aircraft's magnetic compass to give the aircraft's magnetic heading, and the intended purpose of the three-phase resolver is to operate the repeater pointer of such a radio magnetic indicator. If no radio magnetic indicator is fitted the resolver in question can be used to provide a computer input by applying three pre-set A.C. voltages to its rotor and coupling its stator windings to a receiver synchro which is employed to drive the $\alpha-\beta$ resolvers 38, 39 in the computer directly. The stator of the receiver synchro is made angularly-adjustable manually against a scale provided, this enabling the map angle $\alpha$, which is a constant for each map strip, to be set in.

If, on the other hand, the three-phase output resolver included in the VOR bearing presentation instrument is in use to operate a radio magnetic indicator, the chart computer has its own 30 c.p.s. resolver 48, similar to that used in this instrument, and with its stator windings connected in parallel with those in the output resolver 45 of the bearing presentation instrument. The rotor electrical output of the computer resolver 48 is employed, after amplification at 47, to drive a motor 49 coupled to the resolver shaft 46, which shaft is also further coupled to the $\alpha-\beta$ resolvers 38, 39. The stator body of the computer resolver 48 can be rotated manually and its position read against a fixed scale, to enable the map strip angle $\alpha$ to be set in so that the resolver output shaft position represents $\alpha-\beta$.

Alternatively, should the existing navigation aid equipment in the aircraft comprise a loop synchro instrument providing the bearing of a ground station relative to the fore-and-aft aircraft axis (ADF equipment), this instrument is connected to a three-wire resolver 50 in the chart computer. The resolver 50 is driven mechanically through a shaft 226 by an intercoupled synchro-and-motor servo assembly 51, 227 slaved to the heading shaft of the aircraft's magnetic compass or equivalent source of azimuth signals, the servo synchro stator being adjustable angularly so that magnetic variation can be set in; by this means the aircraft heading is added to the relative bearing, thus providing the true bearing. The output potential of the resolver 50 is applied to a receiver synchro 52 whose rotor output drives the motor 49 on the shaft 46 which is coupled to the shaft of the synchro 52. As before, the stator of the receiver synchro 52 is manually rotatable against a scale, as by means of the control knob 222, to enable the map strip angle $\alpha$ to be set in.

The $\alpha-\gamma$ quantity for positioning the resolvers 40, 41 is computed similarly, using the existing aircraft navigation equipment presenting the bearing indication from a different radio beacon. To this end, the equipment just described for interpreting the VOR or ADF bearing input in respect of the first beacon is repeated, as shown immediately below in the drawing at 228, to afford a channel for the bearing input in respect of the second beacon. The operation of this further channel is identical with that of the first channel already described, and it positions a shaft 229 coupled to the resolvers 40, 41. In each beacon channel there is a selector switch for applying either the VOR or the ADF bearing signal to the amplifier 47 for driving the motor 49, and so it is possible to choose for operating the resolvers 38 to 41 either twin VOR or twin ADF inputs, or one of each.

The solenoid which holds the pen against the back of the map can be arranged to be energised, directly or indirectly, by signals from each of the two bearing-finding equipments, which signals are normally provided to indicate that that equipment is operating satisfactorily. Thus if either bearing-finding equipment fails to produce a reliable signal, for example through a receiver fault or through flying out of range of the beacon, the solenoid will be released, and the pen cease to mark the paper. Consequently, the operation of the pen has a "fail safe" characteristic. Should signals reappear after an interval the map and carriage will automatically move rapidly to display the new aircraft position and recording will recommence.

In addition to the "fail safe" function, the current to the solenoid is intentionally interrupted for, say, two seconds, in every minute in order to produce a small gap in the recorded track every minute. This accordingly provides a succession of time markers along the track from which ground speed may very readily be deduced.

The servo-motor or synchro 21 mounted on the pen carriage is fed with a signal representing magnetic heading from the aircraft's gyrosyn, or equivalent, compass. The stator body of the synchro is arranged for manual angular adjustment by a control knob on the frame of the chart recorder which operates against a calibrated scale, whereby the synchro body can be rotated so that the scale reading is the algebraic sum of the local magnetic variation and the map angle $\alpha$. The synchro 21 will then follow the true heading of the aircraft and the pointer 22 attached to its shaft will display this. The pointer 22 is in the form of a transparent plastic, for example Perspex, rod below the map, and will appear on the map as a bright line (showing the heading) with a dark line on each side of it. The scale 23 associated with the heading pointer is disposed at the other side of the synchro shaft and is a small transparent scale calibrated 20°–0–20°, the zero being opposite the pointer. The shadow of this scale is cast on the back of the map and the scale is read against the written track. With the pointer displaying aircraft heading, the angle between the pointer and the track drawn by the pen, as shown by the scale 23, represents the drift angle.

A further facility which may be provided for the pilot's use enables him, having established his drift angle as described, to offset angularly the synchro body by the amount of the drift so that the drift pointer 22 now displays "track made good" (provided no substantial changes of heading take place). The pointer may now be used as a direction indicator to steer the aircraft to a given point on the map, so long as the drift angle remains the same; any change in drift angle during this procedure will be shown by a deviation of the track drawn by the pen from the zero on the drift scale.

If desired, means to set automatically the map strip angle $\alpha$, when the map strip is fitted to the chart-recorder rollers, can be provided. This may take the form of punched card, or analogue data punched or printed on the map margin. Also if desired, the co-ordinates $x_1$, $y_1$ etc. of the ground beacon being used can be arranged to be set in the computer automatically by the action of tuning the beacon on the aircraft receiver. Another possibility is the provision of equipment for tuning the best pair of available radio beacons automatically, depending on the location of the aircraft, and simultaneously setting in the computer the corresponding co-ordinates of the positions of the two selected beacons.

The operation of the equipment according to the invention on the basis of information available from existing Doppler navigation aid equipment will now be considered. As mentioned previously, navigation aid equipment operated on the Doppler principle provides information as to path speed of the aircraft, and its drift angle. Referring to FIGURE 7, to obtain the $x$ and $y$ coordinates of the aircraft position on the map strip, the following expression may be used:

$$\frac{dx}{dt} = \left\{v - \frac{1}{2v}\cdot\left(\frac{dh}{dt}\right)^2\right\}\cdot\frac{\sin(\theta+D-\alpha)}{\cos 2Q}$$

and $$\frac{dy}{dt} = \left\{v - \frac{1}{2v}\cdot\left(\frac{dh}{dt}\right)^2\right\}\cdot\frac{\cos(\theta+D-\alpha)}{\cos 2Q}$$

where:
$\alpha$ is the angle between the map edge and north as before;
$v$ is the path speed;
$D$ is the drift angle;
$h$ is the altitude of the aircraft;
$\theta$ is the true heading;
$Q$ is the pitch angle of the aircraft.

The first term in the brackets on the right hand side of each of these expressions represents the path speed of the aircraft corrected for any inclination of the flight path, while the term with cos 2Q in the denominator corrects for the results of pitch up or down of the aircraft. The two corrections are small and are zero in level flight. A further correction for altitude is so small as to be negligible in the present instance.

In the computer layout of FIGURE 4, section 231 (FIGURE 4D) is provided for computing the quantities in the above two expressions. A signal representing $$\frac{dh}{dt}$$

can be obtained, for example, from the tachometer-generator of a servo follow-up type altimeter, and this is passed to a diode shaping network 60 to produce a potential approximating to $$\left(\frac{dh}{dt}\right)^2$$

The result is multiplied by $$\frac{1}{v}$$

by means of a non-linear potentiometer 61, and is applied to a modulator 62 to obtain an equivalent A.C. signal which will be seen to be commensurate with the term $$-\frac{1}{2v}\cdot\left(\frac{dh}{dt}\right)^2$$

The Doppler equipment normally provides path speed as a shaft position, and this is employed to position the arm of the potentiometer 61, and also that of a further potentiometer 63 which provides a voltage representing path speed $v$. This further voltage is summed with the voltage from the modulator 62 thereby affording the term in parenthesis in each of the above expressions.

The summed potential is applied to energise a potentiometer 64 which serves to divide the signal by cos 2Q. The arm of this potentiometer may be operated by the auto-pilot pitch gyro, by means of a follow-up servo system (which may form part of the existing aircraft equipment). The output from the arm of the potentiometer 64 is employed for energising the stator winding of a resolver synchro 65 which has its rotor positioned in accordance with the quantity $\theta+D$. The angle $\alpha$ is subtracted by angular adjustment of the stator of the resolver by an amount representing the map angle, and the outputs from sine and cosine arms of the resolver thereby become respectively commensurate with the right hand sides of the expressions for $\dot{x}$ and $\dot{y}$.

The angles $\theta$ and $D$ are combined for application to the resolver shaft by differential gearing 66. The drift angle $D$ is provided as a shaft position from a synchro and-motor servo asembly 232 driven by the Doppler equipment, while the heading angle $\theta$ is given by the previously described servo assembly 51, 227.

The output signals from the resolver 65 are applied through conductors 233, 234, to control the operation of the pen carriage and chart feed motors 27, 25. Since the Doppler equipment supplies only rate signals, the initial position of the aircraft on the map is set manually.

Referring now to FIGURE 8, this shows the map strip geometry for the case in which the information provided by the existing aircraft navigation aid equipment consists of the bearing of a ground station and the aircraft's range or slant distance from its (TACAN or VORTAC equipment). If $d_s$ is the slant distance between the beacon and the aircraft, $d_p$ is the corresponding ground or plan distance, $h$ is the aircraft altitude, and $h_g$ the ground station altitude; then $$d_s^2 = d_p^2 + (h-h_g)^2$$

The section of the computer which computes this expression is shown at 235 in FIGURE 4D. The above expression for obtaining the plan distance $d_p$ is solved by the computer in the form of the two expressions $$(h-h_g)\sin E = d_s$$

and $$d_p = d_s \cos E$$

which will be seen to be the equivalent of the first equation, when E represents the elevation angles of the slant path from the plan distance path.

The slant distance, available from the existing aircraft navigation aid equipment, is provided from a potentiometer 70 as a potential for energizing a stator winding of a resolver synchro 73. The output of one winding of the rotor of the resolver synchro 73, commensurate with $d_s$ multiplied by the sine of the resolver shaft angle, is fed to the input of an amplifier 71. An altitude signal $h$, obtained for example from a servo follow-up type altimeter, is also fed to the amplifier at 236. A potentiometer 76 is adjustable manually to provide the fixed quantity $h_g$ or ground station altitude for feeding into the amplifier 71, so that this input together with that at 236 provides a quantity commensurate with $h-h_g$. This is compared with the signal from the resolver 73, the difference or error signal at the amplifier output being used to drive a motor 72 that rotates the shaft of the resolver 73 to a null position.

At the null therefore, the two amplifier inputs are equal, making the amplifier input from the resolver 73 commensurate with $d_s \sin E$ in accordance with the first of the above two expressions in E; or in other words the position of the resolver shaft 237 represents the elevation angle E. The output of the other rotor winding of the resolver 73, which appears on line 238, is thus commensurate with $d_s \cos E$, which in accordance with the second of the above expressions in E is equal to $d_p$, the plan distance.

As will be seen from a consideration of FIGURE 8, the $x$ and $y$ coordinates of the aircraft's position A are given by the expressions:

$$x = x_1 + d_p \sin(\beta - \alpha)$$
$$y = y_1 + d_p \cos(\beta - \alpha)$$

where $\beta$ is the true bearing of the ground station. The rotor of a resolver 77 is positioned in accordance with the bearing angle $\beta$ by means of a synchro-and-motor follow-up servo arrangement 78, 239 responding to the signal available from the existing navigation aid equipment. Magnetic variation is removed from the bearing by angular adjustment of the stator body of the servo-synchro. The stator of the resolver 77 is energized by the $d_p$ signal from the resolver 73, and is capable of manual angular adjustment to set in the map angle $\alpha$. Accordingly the outputs from the two windings of the resolver 77 represent $d_p \sin(\beta - \alpha)$ and $d_p \cos(\beta - \alpha)$ respectively. To obtain the full expressions of the right hand sides of the above equations for the coordinates $x$ and $y$, signals commensurate with the fixed quantities $x_1$ and $y_1$ are added at summing amplifiers 80 and 81, these signals being fed on conductors 240, 241 from the manually set potentiometers 30 and 31. The outputs from the amplifiers 80 and 81 are fed on conductors 242, 243 to drive the servomotors 25 and 27 respectively.

It is further possible, by the sections of the FIGURE 4 layout denoted 244, 245, 246 and 247 (FIGURES 4A and 4E), to derive the $x$ and $y$ signals, for operating the chart roller and pen carriage of the chart recorder described, from the previously-mentioned existing type of navigation aid which employs hyperbolic coordinates (Decca Navigator equipment). In this existing system, the ground stations employed are grouped in chains of four consisting of a master station and three slave stations. The slave stations are conveniently designated red, green and purple, and of the three only the two most appropriate to the aircraft position are employed in obtaining any one fix. The basic information which the equipment affords represents the difference in the respective distances of the aircraft from one of the two chosen slave stations and from the master station, together with the corresponding difference in the distances of the aircraft from the other slave station and the master.

The four ground stations in each chain transmit continuous-wave radio signals on correlated wavelengths, so that between each master-and-slave pair of stations there exists a fixed pattern consisting of a family of hyperbolic lines where the signals are in phase. The space between adjacent iso-phase hyperbolae is termed a "lane." The distances from the master station to the red, green and purple slaves are substantially 240, 180, and 300 wavelength equivalants respectively, and the lanes between each master-and-slave pair are grouped in "zones" which each comprise 24, 18 and 30 adjacent lanes in the case of the red, green and purple slaves respectively. Thus, substantially ten zones make up the complete distance between the master and any slave.

Although the existance of a fixed pattern of constant-phase lines implies a common transmission frequency, the frequencies of the station transmissions all differ in order to enable the receiver in an aircraft to distinguish between them. The phase comparison is effected by choosing frequencies which are harmonically related and suitably multiplying the received frequencies in the aircraft equipment to obtain common comparison frequencies. Thus, if $f$ is the fundamental frequency, the frequencies transmitted by the master and red, green and purple slaves are $6f$, $8f$, $9f$ and $5f$ respectively, and by separately multiplying the master frequency by factors of 4, 3 and 5, and the red, green and purple slave frequencies by factors of 3, 2 and 6 respectively, common comparison frequencies of $24f$, $18f$ and $30f$ are generated.

For each master-and-slave pair of stations, there is a different section 245, 246 or 247 of the computer, indicated in FIGURE 4E as "red," "green" and "purple" according to the designations of the slaves. Since the arrangement and operation of these sections is similar, detailed reference will only be made to the "red" section 245.

The aircraft receiver signal output of each master-and-slave pair is in the form of two D.C. signals, one of which is a maximum whenever the aircraft position gives a difference of distances which is equivalent to a whole number of wave lengths and varies with the phase of the difference, while the other signal is at 90° to this in terms of phase of the difference. In the existing navigation aid equipment these signals are applied to two sets of field coils at right angles in an indicating instrument having a magnetised disc rotor. However, for present purposes, it is necessary to translate this two-phase output, in respect of each pair of master and slave stations used, into a shaft position logging the total phase change from, say, the master station to the instantaneous aircraft position. This is done by reversing the two phases of the output in a synchronous vibrator 84, running for example at about 400 cycles per second, filtering the output if necessary, and applying the result to the stator windings of a resolver synchro 85. The synchro rotor potential is amplified at 86 and fed to a motor 87 which is geared at 248 to drive the synchro rotor to a null position. The rotor shaft 249, of which one revolution represents one lane between iso-phase hyperbolae, is geared, through reduction gearing 125, 126, to two further shafts 127, 128.

Since the phase change between each pair of adjacent iso-phase hyperbolae is the same, the lanes have no individual identity and ambiguity is present. The existing navigation aid equipment partially resolves this by the intermittent transmission of a much coarser pattern of hyperbolae, that is to say 8, 9 and 5 times as coarse respectively as the basic red, green and purple patterns. For present purposes the additional signals from this are connected similarly through the synchronous vibrator to another resolver synchro 88, the rotor potential of which is fed to the motor 87 in place of its normal input, by way of a relay 89 and the amplifier 86, during the appropriate transmission periods. The shaft of the resolver 88 is the above-mentioned shaft 127 geared to that of the resolver 85; the arrangement of the gearing 125 affords a speed reduction from the shaft 249 of the resolver 85 to the shaft 127 of the resolver 88 equal to 8:1 if the red slave station is in use, or 9:1 for the green slave or 5:1 for the purple. The previously mentioned shaft 128 is the final output shaft and is driven from the shaft 127 of the resolver 88 through the gearing 126 which affords a further speed reduction of 3:1 for the red slave, or 2:1 for the green slave, or 6:1 for the purple. Thus the total speed reduction between the shaft 249 of the resolver 85 and the output shaft 128 is 24:1 for the red, or 18:1 for the green, or 30:1 for the purple, so that, as one turn of the resolver shaft represents one lane, one turn of the shaft 128 represents one zone and substantially ten turns the complete translation from the master to slave. The output shaft 128 drives a potentiometer 129 which presents the output in the form of an electrical potential for application to the further computer circuitry to be described below.

The coarser pattern transmitted to provide lane identification does not fully eliminate ambiguity, and accordingly manual controls are necessary for setting in approximately the aircraft's position before switching on the equipment.

Considering FIGURE 9, which represents the geometry of the hyperbolic system, the information afforded may be written:

$$l = AM - AR$$

and $$m = AM - AG$$

when the red and green slave stations R and G are in use, in conjunction with the master station M, to ascertain the position of the aircraft A. The quantities $l$ and $m$ are those logged on the two of the three translation devices which are appropriate to the red and green slaves. The computer is required to derive the position of the aircraft in Cartesian coordinates $x$, $y$, given the Cartesian coordinates of the master and slave stations. To carry this out in a classical manner by direct computation of $x$ and $y$ from the above equations would necessitate a formidable array of computer equipment.

However, an alternative but equally rigorous method will now be suggested. The value of $l-(AM-AR)$ can be computed and used as an error signal for correcting the value of $x$ as logged by a servo. In other words, the value of $x$ thus logged is that corresponding to an intersection of the hyperbola $l=AM-AR$ and the straight line $y=$ a constant. Similarly, the value of $m-(AM-AG)$ is computed and used as an error signal for correcting the value of $y$ as logged by a servo. Thus, the value of $y$ logged is that corresponding to an intersection of the hyperbola $m=AM-AG$ and the straight line $x=$ a constant. Now, in the former case the value of $y$ used is that computed in the latter case, and vice versa. Therefore the points of intersection coincide, and the values of $x$ and $y$ at that point is the solution of the simultaneous equations:

$$l=AM-AR$$
and
$$m=AM-AG$$

This is the position of the aircraft, and the $x$ and $y$ servos mentioned above are, in fact, the chart roller and pen carriage feeding mechanisms of the chart recorder.

It will be appreciated that a straight line can intersect a hyperbola in two points; thus, in FIGURE 9 the straight line $x=Q$ (a constant) intersects the hyperbola $$m=AM-AG$$

at the aircraft's position A and also at a second point $A_1$. A consideration of the servo system will show that only one of these points represents a stable equilibrium, so that in practice no ambiguity results from this mathematical fact. It may be shown, however, that if a value of $y$ is initially set on the servo which lies on the opposite side of the unstable value of $y$ to the stable one, the $y$ servo will run in the wrong direction; for this reason, as well as to avoid the lane ambiguity mentioned above, it is necessary to set approximately the aircraft's coordinates into the equipment by manual controls before switching on the computer.

The computation is performed by the section 244 of the apparatus of FIGURE 4A. The outputs to the pen carriage and chart roller feed servos are obtained on conductors 90 and 91 respectively, and feed back potentials from potentiometers 28, 26 are supplied on conductors 92, 93 to provide potential inputs to the computer section 244 commensurate with the coordinates $x$ and $y$. Assuming that the red and green slave stations are being employed, in conjunction with the master station, the map coordinates $x_m$, $y_m$, $x_r$, $y_r$, and $x_g$, $y_g$, of the master and two slave stations are subtracted from the $x$ and $y$ inputs to give signals commensurate with $x-x_m$ and $y-y_m$, $x-x_r$ and $y-y_r$, and $x-x_g$ and $y-y_g$. The subtraction is performed at pairs of amplifiers 94, 95, 96, 97 and 98, 99, which receive appropriately selected inputs from the feedback conductors 92, 93 and from potentiometers 100, 101, 102, 103 and 104, 105, which potentiometers have manual controls for setting them in accordance with the values of $x_m$, $y_m$, $x_r$, $y_r$, and $x_g$, $y_g$. Alternatively, arrangements can be made for these fixed values to be set in automatically if desired.

The voltages representing $y-y_m$ and $x-x_m$ are applied to the stators of separate resolvers 106, 107 whose rotors are coupled together. The position of the resolver shafts represents a quantity $\beta$, and from one of the rotor windings of the resolver 107 there is taken a potential commensurate with $(x-x_m)\cos\beta$ which is summed with a potential taken from one rotor winding of the other resolver 106 and commensurate with $-(y-y_m)\sin\beta$; the result is fed, after amplification at amplifier 250, to a motor 108 which drives the resolvers to a null position, so as to solve the equation $(x-x_m)\cos\beta-(y-y_m)\sin\beta=0$. From a consideration of FIGURE 9 it will be seen that under these conditions $\beta$ is the map bearing of the aircraft from the master station.

The other rotor windings of the two resolvers 106, 107 supply signals commensurate with the quantities $-(x-x_m)\sin\beta$ and $-(y-y_m)\cos\beta$ and these are summed to give a potential commensurate with $-(x-x_m)\sin\beta-(y-y_m)\cos\beta$. From FIGURE 9 it can be seen that:

$$\sin\beta = \frac{x-x_m}{AM}$$

and $$\cos\beta = \frac{y-y_m}{AM}$$

so that the above expression reduces to:

$$\frac{-(x-x_m)^2}{AM} - \frac{(y-y_m)^2}{AM}$$

Again from FIGURE 9:

$$(x-x_m)^2 + (y-y_m)^2 = AM^2$$

so that our expression becomes:

$$-\frac{AM^2}{AM} = -AM$$

which is the potential applied from the resolvers 106, 107 to both the conductor 90 and the conductor 91, via conductors 251, 252, 253 and 254, 255, 256 respectively.

In a similar way, a potential commensurate with AR is obtained, in response to inputs of $y-y_r$ and $x-x_r$, from a pair of coupled resolvers 109, 110 driven to a null position by a motor 111, and a potential commensurate with AG is obtained, in response to inputs of $y-y_g$ and $x-x_g$, from a pair of resolvers 112, 113 driven to a null position by a motor 114. The AR quantity is fed to the conductor 90, and the AG quantity to the conductor 91.

The additional quantity $l$ obtained in the manner previously described by the red slave translation section 245 is also applied to the conductor 90 from conductor 257, while the quantity $m$ derived by the corresponding green slave translation section 246 is applied via conductor 258 to the conductor 91. The composite signals on the two conductors 90 and 91 are therefore commensurate respectively with $l-(AM-AR)$ and $m-(AM-AG)$. These signals fed to the pen carriage and chart roller servos accordingly solve for the $x$ and $y$ coordinates in the manner already explained.

In order to enable another pair of slave stations to be employed, i.e. red and purple or green and purple, additional potentiometers 259, 260 are provided for setting the coordinates $x_p$, $y_p$ of the purple station, with selector switches 261, 262, 263, 264 to enable these coordinate potentials to feed in in place of either $x_r$, $y_r$ or $x_g$, $y_g$ as desired. Also further switches 265, 266 enable either the $l$ or the $m$ signal quantity of the red and green stations respectively to be replaced by the equivalent quantity $n$ for the purple station on conductor 267.

To enable selection to be made of the sections of the computer 205 appropriate to the particular type of navigational aid supplying the inputs, ganged switches 268 are provided operable to connect the output servos 25, 27 to the different sections of the computer.

In temperate and equatorial latitudes it is usual to use maps on Mercator's projection for navigation, and it is proposed that strips cut from such maps should be employed in the chart recorder described. The errors due to the use of this projection will now be considered.

On Mercator's projection maps, a great circle, which is the direction line of a radio bearing, appears as a curve concave toward the equator. That is to say, a straight line on a Mercator map from the radio station to the observer's position (the aircraft) lies nearer the equator than a tangent to that part of the great circle which passes through the same two points. Navigation aid bearing-finding equipment provides the direction of the tangent, whereas the chart recorder computer, in order to write the position of the aircraft on the Mercator map, requires the direction of the straight line. The angle between them is the conversion and is equal to:

½ (the difference in longitude between the aircraft and the radio station) × sin (mean latitude)

If radio stations are chosen whose east-west spacing is not greater than 50 nautical miles, the error due to convergency is usually negligible compared with the inherent system errors in the radio equipment. If, however, the distance is, say, of the order of 200 nautical miles, the convergency error may approach the magnitude of the radio equipment error.

The difference in longitude between an aircraft A, the coordinates of which are given by $x$ and $y$, and a radio station B, the coordinates of which are given by $x_1$ and $y_1$, is given by the expression:

$$\Delta \text{ (long.)} = (x-x_1) \cos \alpha + (y-y_1) \sin \alpha$$

where $\alpha$ is the map strip angle.

FIGURE 10 shows one method of computation. A signal representing $y-y_1$, and a further signal representing $x-x_1$, are obtained from the computer as inputs at 269, 270. In accordance with the above equation, these signals require to be multiplied by sin $\alpha$ and cos $\alpha$ respectively, and since the error is small a comparatively crude method of multiplication is adequate. Each of the signals is applied to a resistance 271, 272 of value $r_1$ taps on which are selected by a switch 273, 274 ganged with the map strip angle setting knob on the computer; the taps are arranged to represent sin $\alpha$, in the case of the first signal $y-y_1$, and cos $\alpha$ in the case of the second signal $x-x_1$, so that the summed output from the two switches at transformer 275 is commensurate with $(y-y_1) \sin \alpha + (x-x_1) \cos \alpha = \Delta$ (long.).

To obtain the conversion angle, multiplication by sin (mean latitude) is effected. When the map convergency correction is significant, that is to say when the map strip is long in the east-west direction, the latitude does not vary much, and it is therefore sufficient to feed the $y-y_1$ and $x-x_1$ signals by way of variable resistances 276, 277 each of value $r_2$, which are set by hand before the flight against a scale calibrated in latitude, such that $$\frac{r_1}{r_1+r_2} = \sin \text{ (mean latitude)}$$

Each of these variable resistances may take the form of a tapped fixed resistance and a tap-selecting switch.

By the above means a comparatively rigorous signal representation of the conversion angle can be obtained as an A.C. voltage. However, a simplification of the network is possible, as is shown embodied in the computer layout of FIGURE 4. The greatest contribution of the $x-x_1$ term in the expression for longitude difference occurs when $\alpha = 90°$, i.e. when the map strip extends in the east-west direction, but then cos $\alpha = 0$ and the term disappears. On the other hand if the map strip is long in the north-south direction $x-x_1$ is quite small, probably not more than 50 nautical miles, and the conversion angle, for latitudes of about 50°, is negligible. The expression for longitude difference can therefore be simplified to:

$$\Delta \text{ (long.)} = (y-y_1) \sin \alpha$$

and the part of the network required for the $x-x_1$ term can be omitted.

Thus, at 278 in FIGURE 4, only the $y-y_1$ input, available on conductor 279 from amplifier 35, is employed, the conversion angle network consisting of tapped resistor 271 and variable resistor 276.

Having derived the conversion angle quantity, it is required to add it to or subtract it from the radio bearing $\beta$. Thus it is shown applied, on conductors 280, 281, to the amplifiers 47 of computer section 221, and to the amplifier of the servo assembly 78, 239 of section 235.

It will be understood that many modifications are possible without departing from the scope of the invention. One possible modification consists of the use, in place of a conventional recorder pen depositing an ink track, of an electrically-heated stylus which leaves a trace on a specially-prepared heat-sensitive paper strip. In this case, the pen or stylus need not be lifted from the map strip to leave a time marker space, but can instead have its heating current interrupted for a period.

Other computer components can be employed in place of those described. For instance, series summing of voltages can be effected instead of the parallel summing illustrated. Also it is within the scope of the invention to adapt the computer to accept and interpret inputs from navigational systems other than the particular systems described. Thus, while the sections 245 to 247 of the computer are peculiar to the translation of input signals from Decca Navigator equipment, the technique embodied in section 244 for solving from hyperbolic coordinates is of general application and can be used in conjunction with hyperbolic systems other than the Decca Navigator.

I claim:
1. Navigation aid equipment for use in a vehicle displaying the travel of said vehicle, comprising, in combination: a map; map marker means; first motive means for providing relative movement between said map and said map marker means in a first direction; second motive means for providing relative movement between said map and said map marker means in a second direction perpendicular to said first direction; computer means for receiving input signals from a selected pair of radio navigation systems and for providing output signals to operate said motive means and thereby to trace the track of said vehicle on said map, each of said motive means comprising a servomotor selectively connectable as either a position servomechanism or as an integrating servomechanism; a plurality of radio navigation systems for providing input signals; and selector means for selecting said selected pair of input signals and for selectively connecting said servomotors.

2. Equipment according to claim 1 in which said plurality of radio navigation systems includes a first type of system operable to provide bearing information and a second type of system operable to provide velocity information.

3. Navigation display apparatus for indicating travel of a vehicle with respect to fixedly located radio navigation facilities, comprising, in combination: means for supporting a map; map marking means; first and second motive means for providing relative movement in two mutually perpendicular directions to mark the track of said vehicle on said map; means for providing a first input signal representing the difference between the distance between said vehicle and each of first and second radio stations; means for providing a second input signal representing the difference of the distances between said vehicle and said second station and the distance between said vehicle and a third radio station; means operated by said motive means for deriving first and second feedback signals commensurate with rectangular coordinates of the instantaneous position of said map marking means on said map; means for comparing said first feedback signal separately with each of a first trio of computer signal quantities representing respectively map ordinates of said ground stations to derive first, second and third computer potentials; means for comparing said second feedback signal separately with each of a second trio of computer signal quantities representing respectively map abscissae of said ground stations to derive fourth, fifth and sixth computer potentials; first, second and third summing means for deriving a third trio of computer signal quantities; means for multiplying said first and fourth computer potentials separately by the sine and cosine of a first of said third trio of computer quantities to obtain first sine and cosine outputs and second sine and cosine outputs; means for multiplying said second and fifth computer potentials separately by the sine and cosine of a second of said third trio of computer quantities to obtain third sine and cosine outputs and fourth sine and cosine outputs; means for multiplying said third and sixth computer potentials separately by the sine and cosine of a third of said third trio of computer quantities to obtain fifth sine and cosine outputs and sixth sine and cosine outputs; means for applying said first sine and second cosine outputs as inputs to said first summing means, said third sine and fourth cosine outputs as inputs to said second summing means, and said fifth sine and sixth cosine outputs as inputs to said third summing means; and means for summing said first and third cosine outputs and said second and fourth sine outputs with said first input quantity, and for summing said first and fifth cosine outputs and said second and sixth sine outputs with said second input quantity, thereby to obtain first and second control signals to control said motive means.

4. Navigational aid equipment comprising, map drive means and map marker drive means for moving a map strip and map marker means in directions at right angles to one another, the map being of conventional projection, such as Mercator's projection; input conductors for receiving input analog quantities from signals of a radio navigation system employing hyperbolic coordinates, a first one of said input quantities representing the difference in the distances between the equipment and a first fixed radio station and between the equipment and a second fixed radio station, a second one of said input quantities representing the difference in distance between the equipment and the first radio station and the equipment and a third fixed radio station, and computer means to operate on the input quantities and derive therefrom two output signals, representing map position in ordinary Cartesian coordinates, for application as control signals to the map drive means and marker drive means, said computer means including means to operate on feedback signals representing the positions of the map strip and the marker means to derive first, second, and third computer quantities representing respectively the distances between the equipment position as plotted on the map strip and the first, second and third radio stations, and means for subtracting the first and second quantities and comparing the difference with the first input quantity and for subtracting the first and third quantities and comparing the difference with the second input quantity to obtain said two output signals for application to drive the map drive means and marker means to null positions.

References Cited in the file of this patent

UNITED STATES PATENTS

| | | |
|---|---|---|
| 1,891,502 | Sayre | Dec. 20, 1932 |
| 2,530,428 | Gray | Nov. 21, 1950 |
| 2,569,328 | Omberg | Sept. 25, 1951 |
| 2,715,995 | Wirkler | Aug. 23, 1955 |
| 2,769,977 | Roberts et al. | Nov. 6, 1956 |
| 2,804,616 | Pierce | Aug. 27, 1957 |
| 2,814,546 | Nickel | Nov. 26, 1957 |